(12) United States Patent
Keum et al.

(10) Patent No.: US 11,769,634 B2
(45) Date of Patent: Sep. 26, 2023

(54) MULTILAYER CAPACITOR COMPRISING CAPACITOR BODY INCLUDING ACTIVE PORTION AND MARGIN PORTION

(71) Applicant: SAMSUNG ELECTRO-MECHANICS CO., LTD., Suwon-si (KR)

(72) Inventors: Dong Hoon Keum, Suwon-si (KR); Dong Seuk Kim, Suwon-si (KR); Geon Yong Lee, Suwon-si (KR); Seong Gu Kang, Suwon-si (KR); Young Hoon Song, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 17/371,789

(22) Filed: Jul. 9, 2021

(65) Prior Publication Data

US 2022/0189698 A1 Jun. 16, 2022

(30) Foreign Application Priority Data

Dec. 16, 2020 (KR) .................. 10-2020-0176366

(51) Int. Cl.
| | |
|---|---|
| *H01G 4/30* | (2006.01) |
| *H01G 2/06* | (2006.01) |
| *H01G 4/012* | (2006.01) |
| *H01G 4/12* | (2006.01) |
| *H01G 4/224* | (2006.01) |

(52) U.S. Cl.
CPC ............ *H01G 4/30* (2013.01); *H01G 2/065* (2013.01); *H01G 4/012* (2013.01); *H01G 4/1218* (2013.01); *H01G 4/224* (2013.01)

(58) Field of Classification Search
CPC .......... H01G 4/30; H01G 2/065; H01G 4/012; H01G 4/1218; H01G 4/224; Y02P 70/50
See application file for complete search history.

(56) References Cited

U.S. PATENT DOCUMENTS

| | | | | |
|---|---|---|---|---|
| 6,043,974 | A * | 3/2000 | Chen | ................. C04B 35/49 |
| | | | | 361/321.2 |
| 9,978,523 | B1 * | 5/2018 | Park | ................. H01G 4/224 |

(Continued)

FOREIGN PATENT DOCUMENTS

| | | | |
|---|---|---|---|
| JP | 2011132071 A | * | 7/2011 |
| KR | 10-1423913 B1 | | 7/2014 |
| KR | 10-1771728 B1 | | 8/2017 |

*Primary Examiner* — David M Sinclair
*Assistant Examiner* — Daniel M Dubuisson
(74) *Attorney, Agent, or Firm* — MORGAN, LEWIS & BOCKIUS LLP

(57) ABSTRACT

A multilayer capacitor includes a capacitor body including first to sixth surfaces and including a plurality of dielectric layers and first and second internal electrodes alternately disposed with the dielectric layers interposed therebetween, and first and second external electrodes disposed on the third and fourth surfaces of the capacitor body and connected to the first and second internal electrodes, respectively, wherein the capacitor body includes an active region in which the first and second internal electrodes overlap in a first direction, and at least a portion of a margin portion excluding the active region in the capacitor body has a ratio of Ba to Ti less than 1 (Ba/Ti<1) and has a twin boundary structure.

12 Claims, 11 Drawing Sheets

(56) References Cited

U.S. PATENT DOCUMENTS

| | | | |
|---|---|---|---|
| 2002/0013213 A1* | 1/2002 | Sato | H01G 4/1227 501/139 |
| 2012/0252657 A1* | 10/2012 | Sato | H01G 4/30 336/200 |
| 2013/0258547 A1 | 10/2013 | Mizuno | |
| 2013/0258548 A1* | 10/2013 | Mizuno | H01G 4/30 361/301.4 |
| 2014/0022692 A1 | 1/2014 | Yoon et al. | |
| 2017/0018358 A1* | 1/2017 | Isota | H01G 4/30 |
| 2017/0278634 A1* | 9/2017 | Kato | H01G 4/0085 |
| 2018/0033555 A1* | 2/2018 | Yoon | C04B 35/4682 |
| 2018/0240592 A1* | 8/2018 | Morita | H01G 4/232 |
| 2019/0362897 A1* | 11/2019 | Kato | H01G 4/224 |
| 2021/0118617 A1* | 4/2021 | Morita | H01G 4/1245 |

* cited by examiner

MULTILAYER CAPACITOR COMPRISING CAPACITOR BODY INCLUDING ACTIVE PORTION AND MARGIN PORTION

CROSS-REFERENCE TO RELATED APPLICATION(S)

This application claims the benefit under 35 USC 119(a) of Korean Patent Application No. 10-2020-0176366 filed on Dec. 16, 2020 in the Korean Intellectual Property Office, the entire disclosure of which is incorporated herein by reference for all purposes.

BACKGROUND

1. Field

The present disclosure relates to a multilayer capacitor and a board for mounting the same.

2. Description of Related Art

A multilayer capacitor (or a multilayer ceramic capacitor (MLCC)) is a passive component and serves to control an electrical signal in a circuit.

For industrial and automotive MLCCs requiring high reliability, a voltage applied per unit thickness has increased according to market demand and use temperatures of actual use cases have also increased.

At high voltages, electrostriction cracks accompanied by an electrostriction phenomenon occur, and at high temperatures, defects accompanied by thermal expansion due to material expansion occur.

In order to solve such cracking defects, a solution is sought with various interpretations and approaches, but it is still difficult to adjust the inherent material properties below a threshold voltage.

SUMMARY

Exemplary embodiments provide a multilayer capacitor having improved high temperature reliability and moisture resistance reliability by suppressing crack defects due to electrostriction cracks and thermal expansion by increasing mechanical strength.

According to an exemplary embodiment, a multilayer capacitor includes: a capacitor body including first and second surfaces opposing each other in a first direction, third and fourth surfaces opposing each other in a second direction, perpendicular to the first direction, and fifth and sixth surfaces opposing each other in a third direction, perpendicular to the first direction and including a plurality of dielectric layers and first and second internal electrodes alternately disposed with the dielectric layers interposed therebetween; and first and second external electrodes disposed on the third and fourth surfaces of the capacitor body and connected to the first and second internal electrodes, respectively, wherein the capacitor body includes an active region in which the first and second internal electrodes overlap in the first direction, and at least a portion of a margin portion excluding the active region in the capacitor body includes barium (Ba) and titanium (Ti) in amounts having a molar ratio of Ba to Ti of less than 1 (Ba/Ti<1) and has a twin boundary structure.

The molar ratio of Ba/Ti of the margin portion of the capacitor body may be 0.9500 to 0.9999.

The molar ratio of Ba/Ti of the active region of the capacitor body may be 1 or more.

The margin portion containing Ba/Ti, a molar ratio of Ba to Ti, less than 1, and having the twin boundary structure may be a portion between the active region and the first and second surfaces of the capacitor body.

The margin portion containing Ba/Ti, a molar ratio of Ba to Ti, less than 1, and having the twin boundary structure may be a portion between the active region and the fifth and sixth surfaces of the capacitor body.

The margin portion containing Ba/Ti, a molar ratio of Ba to Ti, less than 1, and having the twin boundary structure may be a portion between the active region and the first, second, fifth, and sixth surfaces of the capacitor body.

A grain size of the margin portion may be larger than a grain size of the active region.

The grain size of the margin portion may be 1.66 to 6.66 times larger than the grain size of the active region.

The grain size of the margin portion may be 250 to 1000 nm, and the grain size of the active region may be 100 to 400 nm.

According to another exemplary embodiment, a board for mounting a multilayer capacitor includes: a substrate having first and second electrode pads on one surface thereof; and a multilayer capacitor mounted such that first and second external electrodes are connected to the first and second electrode pads, respectively.

BRIEF DESCRIPTION OF DRAWINGS

The above and other aspects, features, and advantages of the present inventive concept will be more clearly understood from the following detailed description, taken in conjunction with the accompanying drawings, in which.

DETAILED DESCRIPTION

Figure 1:
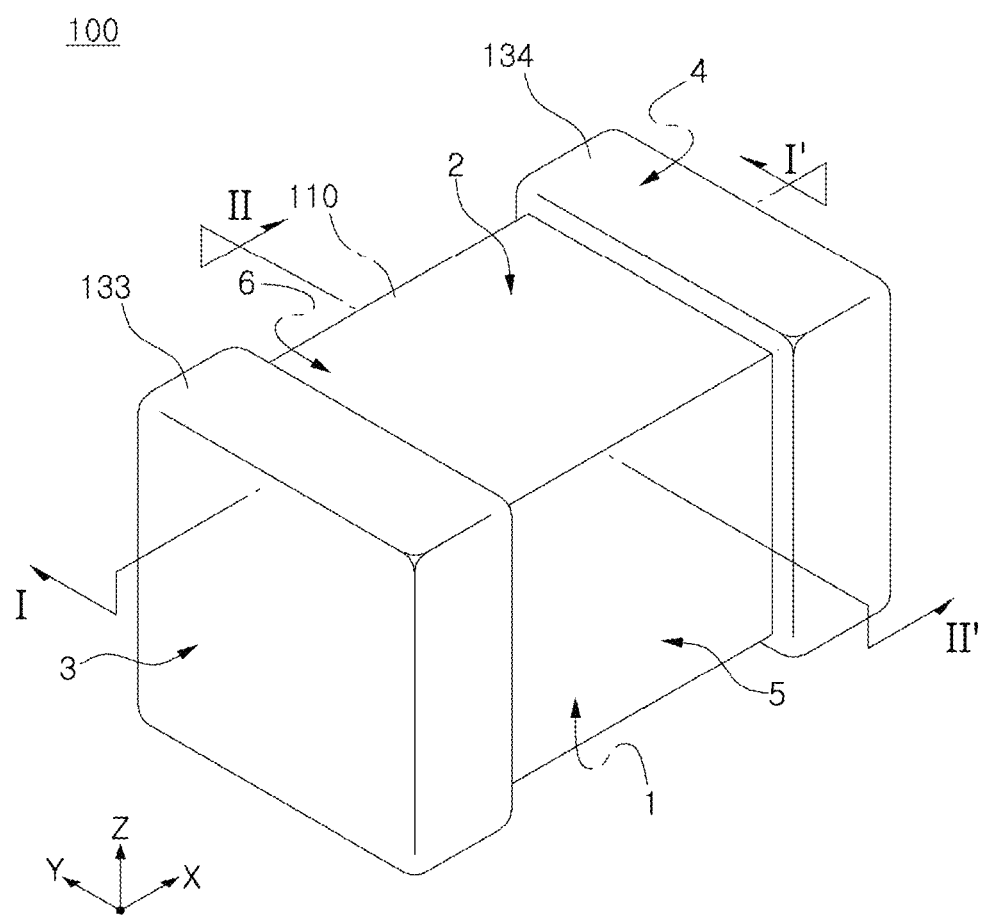
FIG. 1 is a perspective view illustrating a multilayer capacitor according to an exemplary embodiment in the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or exemplary embodiment, e.g., as to what an example or exemplary embodiment may include or implement, means that at least an example or exemplary embodiment exists in which such a feature is included or implemented while all examples and exemplary embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there may be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after gaining an understanding of the disclosure of this application. Further, although the examples described herein have a variety of configurations, other configurations are possible as will be apparent after an understanding of the disclosure of this application.

The drawings may not be to scale, and the relative size, proportions, and depiction of elements in the drawings may be exaggerated for clarity, illustration, and convenience.

Hereinafter, directions of the capacitor body 110 are defined to clearly describe an exemplary embodiment in the present disclosure: X, Y and Z shown in the drawings are respectively a length direction, a width direction, and a thickness of the capacitor body 110, respectively.

In addition, in this exemplary embodiment, the Z direction may be used with the same concept as a stacking direction in which dielectric layers are stacked.

Figure 2:
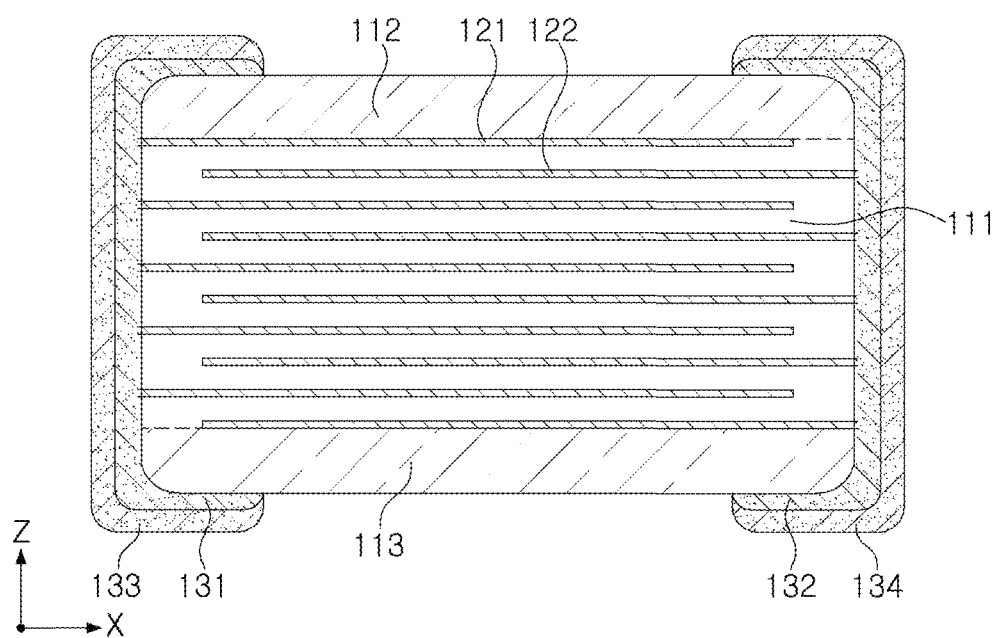
FIG. 2 is a cross-sectional view taken along line I-I' of FIG. 1.
Figure 3:
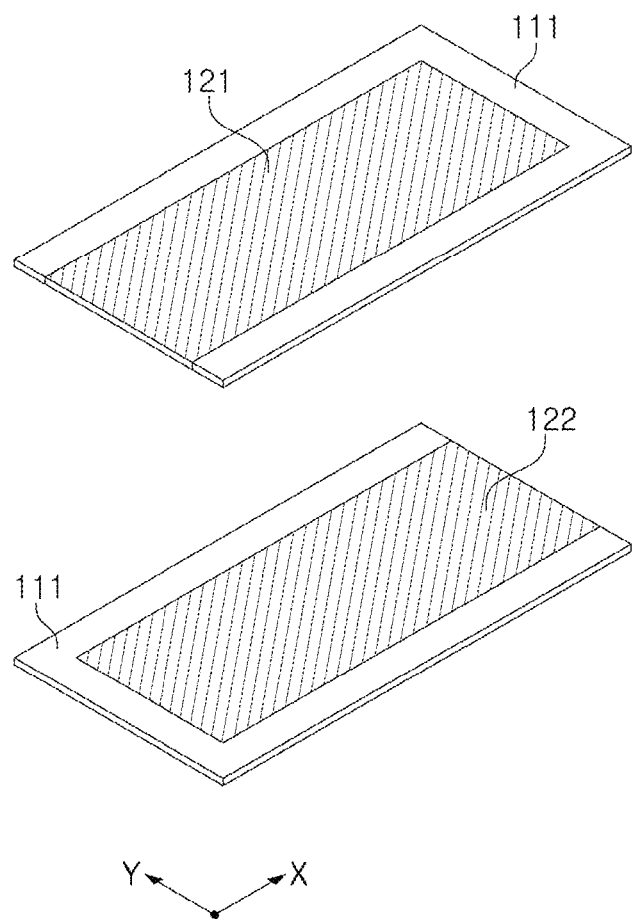
FIG. 3 is an exploded perspective view illustrating a structure of first and second internal electrodes of the capacitor body of FIG. 1.
Figure 4:
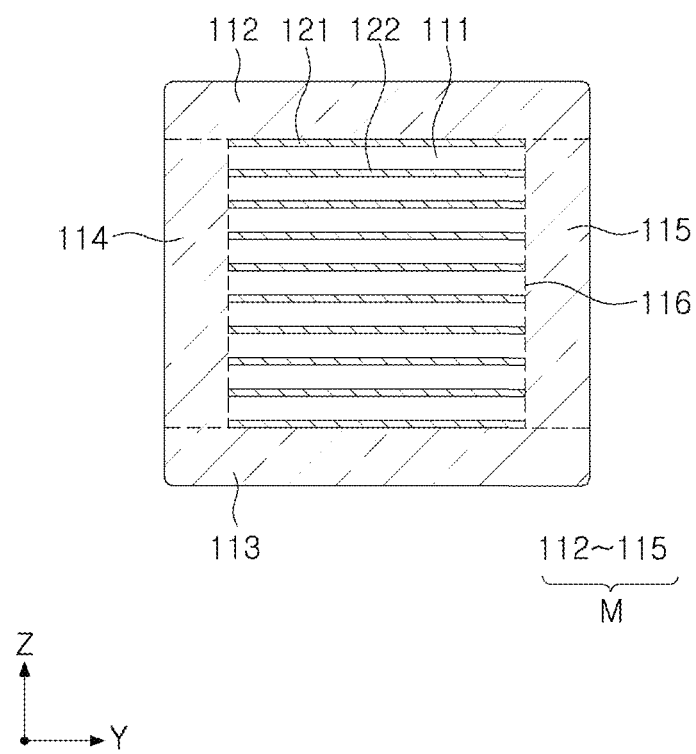
FIG. 4 is a cross-sectional view taken along line II-II' of FIG. 1.

FIG. 1 is a perspective view illustrating a multilayer capacitor according to an exemplary embodiment in the present disclosure, FIG. 2 is a cross-sectional view taken along line I-I' of FIG. 1, FIG. 3 is an exploded perspective view illustrating a structure of first and second internal electrodes of the capacitor body of FIG. 1, and FIG. 4 is a cross-sectional view taken along line II-II' of FIG. 1.

Referring to FIGS. 1 through 4, a multilayer capacitor 100 according to an exemplary embodiment in the present disclosure includes a capacitor body 110 and first and second external electrodes 131 and 132.

The capacitor body 110 includes a plurality of dielectric layers 111 and a plurality of first and second internal electrodes 121 and 122 alternately disposed with the plurality of dielectric layers 111 interposed therebetween.

Here, adjacent dielectric layers 111 may be integrated such that boundaries therebetween may not be readily apparent without using a scanning electron microscope (SEM).

The dielectric layer 111 may include a ceramic material having a high dielectric constant and may include, for example, barium titanate ($BaTiO_3$)-based or strontium titanate ($SrTiO_3$)-based ceramic powder, etc., but the present disclosure is not limited thereto as long as sufficient capacitance may be obtained.

In addition, ceramic additives, organic solvents, plasticizers, binders and dispersants may be further added to the dielectric layer 111 along with the ceramic powder.

The ceramic additives may be, for example, a transition metal oxide or a transition metal carbide, a rare earth element, magnesium (Mg), or aluminum (Al).

In addition, the capacitor body 110 may include first and second surfaces 1 and 2 opposing each other in the Z direction, third and fourth surfaces 3 and 4 connected to the first and second surfaces 1 and 2 and opposing each other in the X direction, and fifth and sixth surfaces 5 and 6 connected to the first and second surfaces 1 and 2, connected to the third and fourth surfaces 3 and 4, and opposing each other in the Y direction.

The capacitor body 110 includes an active region 116 in which internal electrodes overlap in the Z direction as a portion contributing to the formation of capacitance of the capacitor, upper and lower covers 112 and 113 formed on upper and lower surfaces of the active region in the Z direction as upper and lower margin portions, respectively, and first and second margins 114 and 115 provided on opposing sides of the active region 116 in the Y direction as width-directional margin portions, respectively.

The upper and lower covers 112 and 113 may have the same material and configuration as the dielectric layer 111 except that they do not include internal electrodes.

These upper and lower covers 112 and 113 may be formed by stacking a single dielectric layer or two or more dielectric layers on the upper and lower surfaces of the active region in the Z direction, respectively, and basically, serve to prevent damage to the first and second internal electrodes 121 and 122 due to physical or chemical stress.

The first and second margins 114 and 115 are portions of the dielectric layer 111 in which internal electrodes are not formed in the Y direction.

One ends of the first and second internal electrodes 121 and 122 may be exposed to the third and fourth surfaces 3 and 4 of the capacitor body 110, respectively.

The first and second internal electrodes 121 and 122, to which voltages having different polarities are applied, may be alternately disposed with the dielectric layer 111 interposed therebetween in the Z direction and may be electrically insulated from each other by the dielectric layer 111 interposed therebetween.

According to the above configuration, when a predetermined voltage is applied to the first and second external electrodes 131 and 132, electric charges are accumulated between the first and second internal electrodes 121 and 122.

Here, capacitance of the multilayer capacitor 100 is proportional to an area in which the first and second internal electrodes 121 and 122 overlap each other in the Z direction in the active region 116 of the capacitor body 110.

In addition, a material forming the first and second internal electrodes 121 and 122 is not limited and may be formed using a conductive paste including a precious metal material such as platinum (Pt), palladium (Pd), a palladium-silver (Pd—Ag) alloy, or the like, and one or more of nickel (Ni) and copper (Cu).

In this case, a printing method of the conductive paste may be a screen printing method or a gravure printing method, and the present disclosure is not limited thereto.

The first and second external electrodes 131 and 132 are disposed on the third and fourth surfaces 3 and 4 of the capacitor body 110 and electrically connected to exposed portions of the first and second internal electrodes 121 and 122, respectively.

Here, the first and second external electrodes 131 and 132 may extend to portions of the first and second surfaces 1 and 2 of the capacitor body 110 and portions of the fifth and sixth surfaces 5 and 6 of the capacitor body 110.

First and second plating layers 133 and 134 are formed to cover surfaces of first and second conductive layers 131 and 132, respectively.

Here, the first and second plating layers 133 and 134 may include nickel (Ni) plating layers formed on the first and second conductive layers 131 and 132 and tin (Sn) plating layers formed on the nickel plating layers.

In this exemplary embodiment, at least a portion of the margin portions excluding the active region 116 in the capacitor body 110 may include Ba and Ti in amounts having a molar ratio of Ba to Ti of less than 1, and may have crystal grains, which include Ba and Ti, having a twin boundary structure.

Figure 7:
FIG. 7 is a cross-sectional SEM image of the margin portion after applying $TiO_2$ to a stacking of dielectric layers disposed on a capacitor body.
Figure 8:
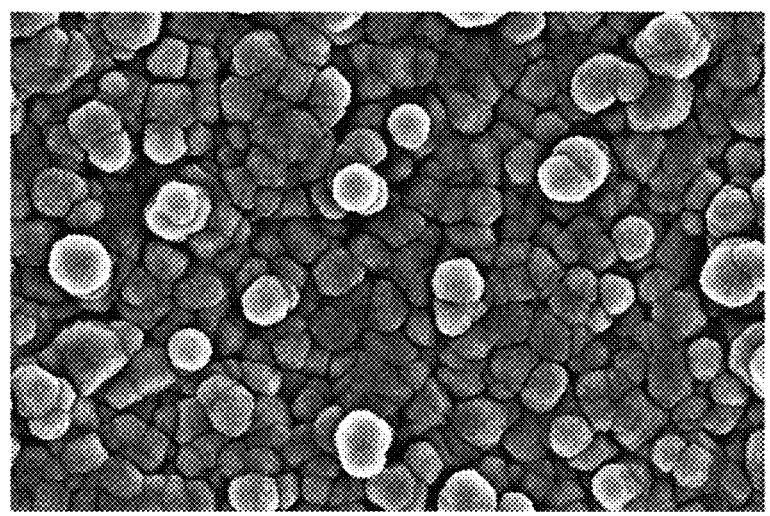
FIG. 8 is a top-view SEM image after applying $TiO_2$.

To form the margin portions, a stack is created by stacking and compressing a plurality of dielectric layers, and $TiO_2$ is applied to at least a portion of a surface of the stack, followed by heat treatment and firing. FIGS. 7 and 8 are SEM images illustrating a state before firing and after the surface of the capacitor body is coated with $TiO_2$.

Here, during the firing, a Ti element of $TiO_2$ coated on the surface of the stack is diffused and absorbed to the margin portion of the stack, so that the Ti-absorbed margin portion of the capacitor body 110 has an increased amount of Ti, compared to the active region.

As a result, the content of Ti increases so that the ratio of Ba to Ti, which is generally 1:1 before firing, becomes less than 1 in the margin portion after firing.

Figure 9:
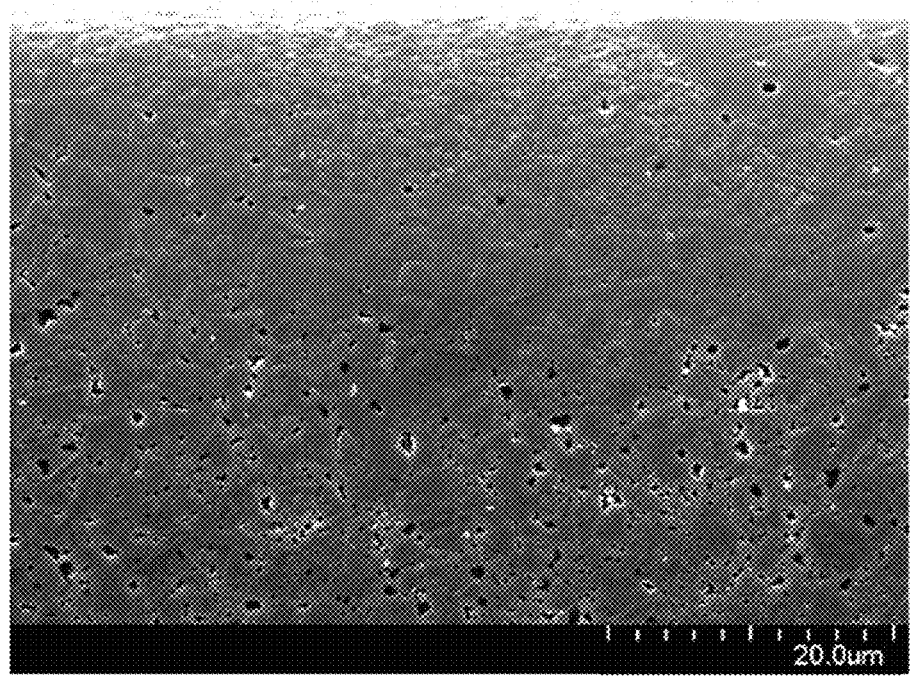
FIGS. 9 and 10 are images illustrating a microstructure of a margin portion surrounded by twin crystals.
Figure 10:
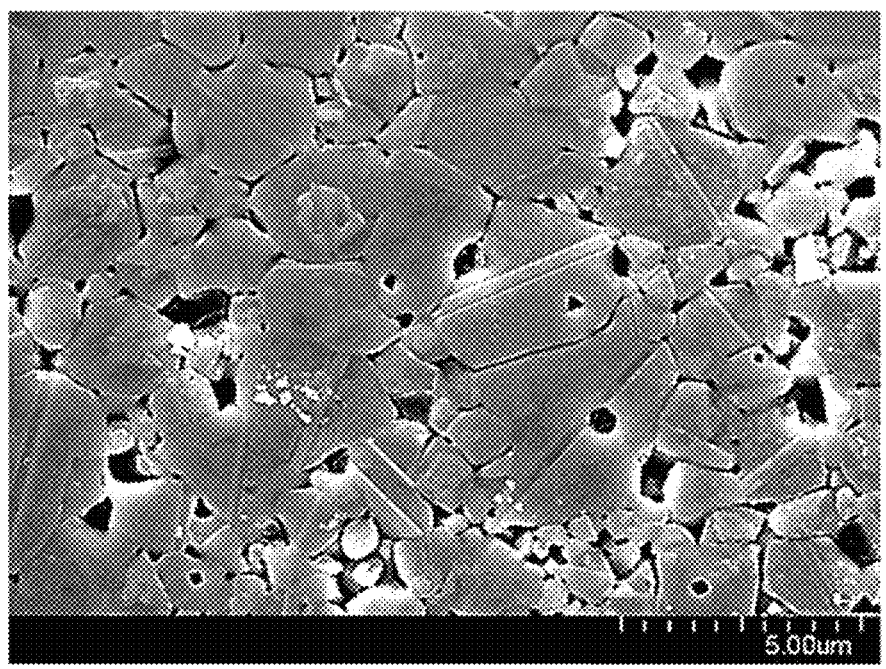

In addition, as shown in FIGS. 9 and 10, the coated $TiO_2$ disappears during firing, non-stoichiometric growth is made in the margin portion, and the size of the grains in the margin portion significantly increase due to a low heat treatment temperature to have a structure surrounded by twin boundaries.

Here, preferably, the molar ratio of Ba/Ti of the margin portion may be 0.9500 to 0.9999.

In addition, the molar ratio of Ba/Ti of the active region 116 of the capacitor body 110 may be generally 1 or higher depending on the design.

In this exemplary embodiment, the molar ratio of Ba to Ti (Ba/Ti) is less than 1, and the margin portions (hereinafter referred to as a twin boundary margin portion) having a twin boundary structure may correspond to portions between the active region 116 and the first, second, fifth, and sixth surfaces 1, 2, 5, and 6 of the capacitor body 110.

That is, the twin boundary margin portions M may include both upper and lower covers 112 and 113 and the first and second margins 114 and 115 in the Y direction.

In addition, a grain size of the twin boundary margin portions M is larger than a grain size of the active region 116.

The grain size of the twin boundary margin portions M may be 250 nm to 1000 nm, and the grain size of the active region 116 may be 100 nm to 400 nm.

Here, the grain size of the twin boundary margin portions M increases in proportion to the grain size of the active region 116, and preferably, the grain size of the twin boundary margin portions M may be larger by 1.66 to 6.66 times than the grain size of the active region 116.

Meanwhile, the present disclosure is not limited thereto, and such twin boundary margin portions may be formed only on a portion of the circumferential surface of the capacitor body.

Figure 5:
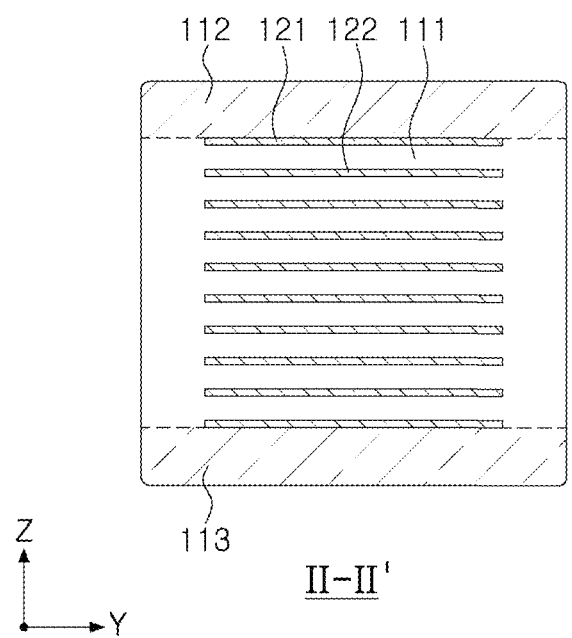
FIG. 5 is a cross-sectional view illustrating another exemplary embodiment of a capacitor body of the present disclosure.

For example, referring to FIG. 5, the twin boundary margin portions may be portions between the active region 116 and the first and second surfaces 1 and 2 of the capacitor body 110.

That is, the twin boundary margin portions may be upper and lower covers 112 and 113, and the first and second margins 114 and 115 in the Y direction may be formed of dielectric materials having the same characteristics as that of the active region 116.

Figure 6:
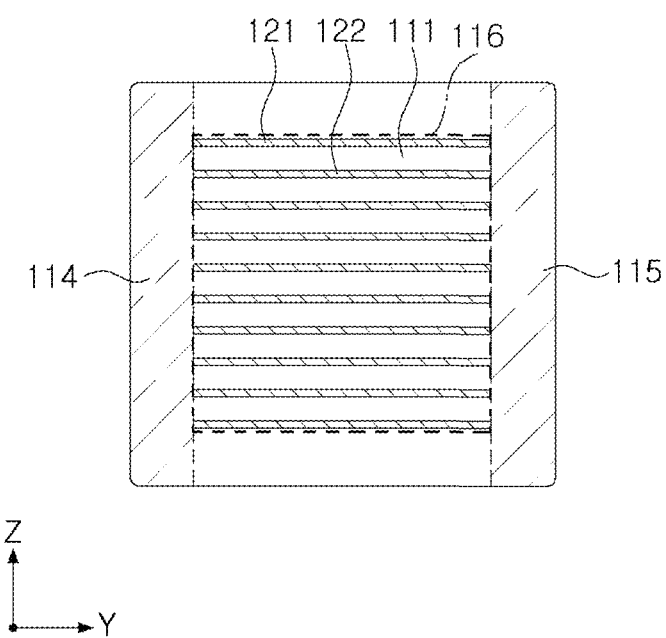
FIG. 6 is a cross-sectional view illustrating another exemplary embodiment of a capacitor body of the present disclosure.

Further, referring to FIG. 6, the twin boundary margin portions may be portions between the active region 116 and the fifth and sixth surfaces 5 and 6 of the capacitor body 110.

That is, the twin boundary margin portions may be the first and second margins 114 and 115 in the Y direction, and the upper and lower covers 112 and 113 may be formed of dielectric materials having the same characteristics as that of the active region 116.

Electrostriction cracks and thermal expansion cracks, which frequently appear in large and high voltage multilayer capacitors, occur due to stress (expansion) based on high voltage and temperatures.

However, the related art multilayer capacitor remains at a level that distinguishes between electrostriction and thermal expansion using electrical behavior under current-voltage.

In the related art, this problem has been solved by simply increasing a thickness of a ceramic sheet in order to lower an applied voltage per unit thickness, but as high-performance chips are increasingly required, there is insufficient space for design margins.

Therefore, in recent years, a stress distribution method based on chip shape control that may be adjusted in a manufacturing stage and an electrostriction selection method under a load that may be used in a sorting stage have been discussed as a solution to such defects.

In this exemplary embodiment, the margin portion M of the capacitor body 110 includes Ba and Ti, and the ratio of Ba to Ti (Ba/Ti) is less than 1, and the margin portion M is divided into an elastically deformed region and a plastic deformed region based on fine tissues having twin boundaries, thereby obtaining the following effects.

In the elastically deformed region, the twin boundaries serve to add a slip system, which may serve to complement the inherent properties of ceramics without any elastic deformation.

Barrier to dislocation motion and high stacking fault energy in the plastic deformed region are one of the reinforcing mechanisms of materials, and the twin boundary having the aforementioned effect in a ceramic material, as well as in a metal, may increase strength and toughness of the margin portion of the capacitor body.

Thus, according to the structure of the margin portion of the present exemplary embodiment, electrostriction cracks and thermal expansion cracks of the multilayer capacitor may be prevented using the effect of increasing the strength based on the microstructure having such twin boundaries.

Figure 11:
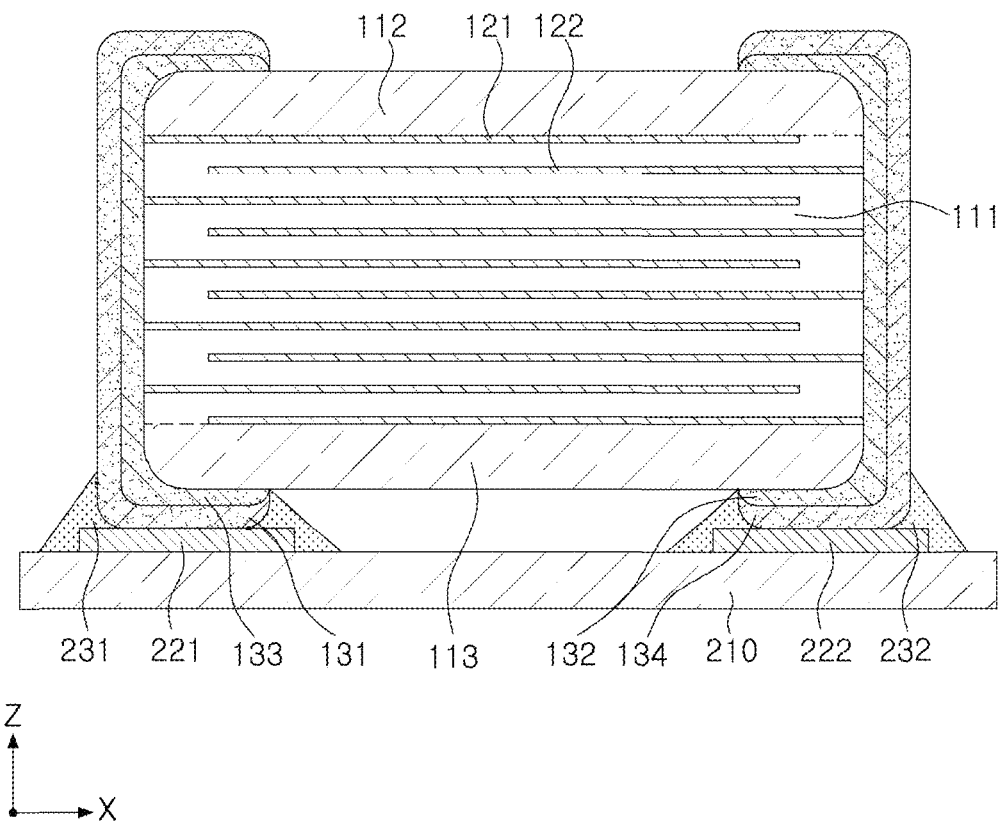
FIG. 11 is a cross-sectional view illustrating that the multilayer capacitor of FIG. 1 is mounted on a board.

FIG. 11 is a cross-sectional view illustrating a state in which the multilayer capacitor of FIG. 1 is mounted on a board.

Referring to FIG. 11, a board for mounting a multilayer capacitor according to the present exemplary embodiment includes a substrate 210 on which the multilayer capacitor 100 is mounted and first and second electrode pads 221 and 222 are spaced apart from each other on an upper surface of the substrate 210.

The multilayer capacitor 100 may be electrically connected to the substrate 210 by solders 231 and 232 in a state in which the first and second external electrodes 131 and 132 are disposed in contact with the first and second electrode pads 221 and 222, respectively.

Here, the multilayer capacitor 100 is the multilayer capacitor according to an exemplary embodiment in the present disclosure described above, and detailed descriptions thereof will be omitted to avoid redundancy.

In addition, the present exemplary embodiment is illustrated and described in a form in which the multilayer capacitor of FIG. 1 is mounted, but the present disclosure is not limited thereto, and as an example, a multilayer capacitor having the configuration of FIG. 5 or 6 may also be mounted with a similar structure on a substrate to configure a mounting board.

As set forth above, according to an exemplary embodiment, high temperature reliability and moisture resistance reliability of the multilayer capacitor may be improved.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A multilayer capacitor comprising:
 a capacitor body including first and second surfaces opposing each other in a first direction, third and fourth surfaces opposing each other in a second direction, perpendicular to the first direction, and fifth and sixth surfaces opposing each other in a third direction, perpendicular to the first direction, and including a plurality of dielectric layers and first and second internal electrodes alternately disposed with the dielectric layers interposed therebetween; and
 first and second external electrodes disposed on the third and fourth surfaces of the capacitor body and connected to the first and second internal electrodes, respectively,
 wherein the capacitor body includes an active region in which the first and second internal electrodes overlap in the first direction, and
 at least a portion of a margin portion between the active region and the fifth and sixth surfaces of the capacitor body and excluding the active region in the capacitor body includes barium (Ba) and titanium (Ti) in amounts having a molar ratio of Ba to Ti of less than 1 (Ba/Ti<1) and includes crystal grains having a twin boundary structure and a grain size of 250 nm to 1000 nm.

2. The multilayer capacitor of claim 1, wherein the molar ratio of Ba/Ti of the margin portion of the capacitor body is 0.9500 to 0.9999.

3. The multilayer capacitor of claim 1, wherein the molar ratio of Ba/Ti of the active region of the capacitor body is 1 or more.

4. The multilayer capacitor of claim 1, wherein the portion of the margin portion further includes a portion between the active region and the first and second surfaces of the capacitor body.

5. The multilayer capacitor of claim 1, wherein a grain size of the margin portion is larger than a grain size of the active region.

6. The multilayer capacitor of claim 5, wherein the grain size of the margin portion is 1.66 to 6.66 times larger than the grain size of the active region.

7. The multilayer capacitor of claim 1, wherein and a grain size of the active region is 100 nm to 400 nm.

8. A board for mounting a multilayer capacitor, the board comprising:
 a substrate having first and second electrode pads on one surface thereof; and
 the multilayer capacitor of claim 1 mounted such that the first and second external electrodes are connected to the first and second electrode pads, respectively.

9. The multilayer capacitor of claim 1, wherein the margin portion is prepared by stacking a plurality of second dielectric layers, compressing the plurality of second dielectric layers, and $TiO_2$ is applied to at least a portion of a surface of the plurality of second dielectric layers, followed by heat treatment and firing.

10. The multilayer capacitor of claim 1, wherein the plurality of dielectric layers include barium titanate ($BaTiO_3$)-based or strontium titanate ($SrTiO_3$)-based material.

11. The multilayer capacitor of claim 1, wherein the plurality of dielectric layers include a ceramic additive.

12. The multilayer capacitor of claim 1, wherein the ceramic additive comprises a transition metal oxide, a transition metal carbide, a rare earth element, magnesium (Mg), or aluminum (Al).

* * * * *